United States Patent [19] [11] Patent Number: 4,629,487
Monji et al. [45] Date of Patent: Dec. 16, 1986

[54] MOLDING METHOD FOR PRODUCING OPTICAL GLASS ELEMENT

[75] Inventors: Hideto Monji, Katano; Masaki Aoki, Minou; Hideo Torii, Higashiosaka; Hideyuki Okinaka, Toyonaka, all of Japan

[73] Assignee: Matsushita Electric Industrial Co., Ltd., Osaka, Japan

[21] Appl. No.: 734,651

[22] Filed: May 16, 1985

[30] Foreign Application Priority Data

May 17, 1984 [JP] Japan ................... 59-99059
Jun. 8, 1984 [JP] Japan ................... 59-118478
Jun. 13, 1984 [JP] Japan ................... 59-121344
Jun. 13, 1984 [JP] Japan ................... 59-121345
Jun. 13, 1984 [JP] Japan ................... 59-121346

[51] Int. Cl.$^4$ ............................................. C03B 40/00
[52] U.S. Cl. ........................................ 65/26; 65/37; 65/122; 65/374.11; 249/114 R; 249/116; 249/134
[58] Field of Search .............. 65/26, 37, 122, 133, 65/268, 374.11; 249/134, 114 R, 116; 425/77, DIG. 26

[56] References Cited

U.S. PATENT DOCUMENTS

| 1,466,640 | 8/1923 | Coleman | 249/116 X |
| 1,868,863 | 7/1932 | Watson et al. | 65/26 |
| 2,947,114 | 8/1960 | Hill | 65/374.11 X |
| 3,397,976 | 8/1968 | Hynd | 65/374.11 X |
| 3,436,203 | 4/1969 | Wu | 65/374.11 X |
| 3,736,109 | 5/1973 | Darling et al. | 65/374.11 X |
| 3,932,085 | 1/1976 | Horbach | 249/134 X |
| 4,139,677 | 2/1979 | Blair et al. | 65/37 X |

Primary Examiner—Robert Lindsay
Attorney, Agent, or Firm—Wenderoth, Lind & Ponack

[57] ABSTRACT

Disclosed is a molding method for producing an optical glass element which comprises the steps of preparing a mold coated with a thin film of a noble metal alloy, and molding optical glass into the form of an optical glass element by using the mold while applying heat and pressure to the optical glass. Further disclosed is such a mold that is coated with a thin film of a noble metal alloy, for producing an optical glass element.

12 Claims, 2 Drawing Figures

MOLDING METHOD FOR PRODUCING OPTICAL GLASS ELEMENT

BACKGROUND OF THE INVENTION

1. Field of the Invention

The present invention generally relates to a molding method for producing an optical glass element such as a lens and a prism. That is, the present invention particularly relates to a molding method in which thermally softened optical glass is hot-pressed by a mold coated with a thin film of a noble metal alloy and molded into the form of an optical glass element having high surface quality and high surface accuracy. Further, the present invention particularly relates to a mold used in such a molding method.

2. Description of the Prior Art

Recently, an optical glass element, particularly, an optical glass lens tends to be made to have an aspherical shape so as to accomplish both the simplification of the lens construction and the minimization in weight of the lens portion in optical devices at the same time. In producing such an aspherical lens, there are some problems as to a working method and mass producibility in the conventional optical polishing method, and wherein a method that optical glass is thermally pressed and ultraprecisely molded (a direct press-molding method) is expected to be full of promise.

Figure 1:
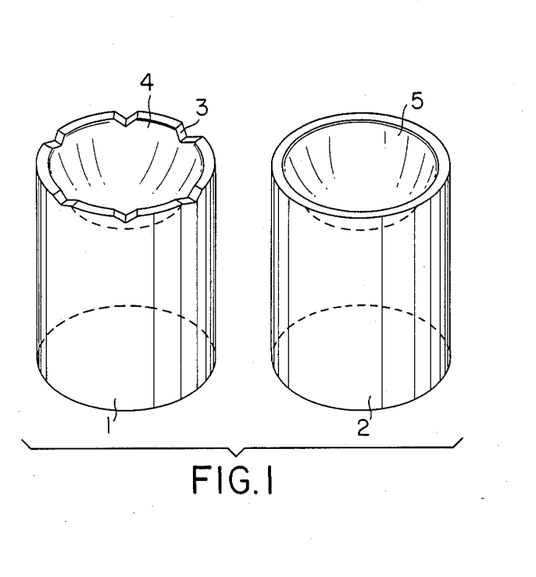
FIG. 1 is a perspective view showing the mold used for molding an optical glass element according to the present invention.

This direct press-molding method is such that a block of optical glass is thermally pressed on an aspherical-shaped mold which has been finished to have a desired surface quality and desired surface accuracy as shown in FIG. 1, or a block of optical glass which has been heated is hotpressed, thereby obtaining an optical glass element.

The optical glass element produced by such a direct press-molding method as described above must be superior in optical properties to an optical glass element produced by the conventional optical polishing method. Particularly, in the case of the aspherical lens, extremely high surface accuracy after molding is required. Therefore, the mold used in the direct press-molding method must have such characteristics that the chemical reaction against the optical glass is minimum under the condition of high temperature that the press-molding surface thereof hardly suffers damage such as a scar or the like and that the mold is improved in heat shock resistance against rapid heating and cooling.

As the mold used in the direct press-molding method, a mold using non-oxides such as silicon carbide (SiC), silicon nitride ($Si_3N_4$) or the like, and a mold in which carbon having high density is coated with silicon carbide (SiC) or the like, have been examined.

The non-oxides such as SiC, $Si_3N_4$, or the like, however, have extremely high hardness and therefore it is very difficult to highly accurately work such a material into a spherical or aspherical shape. Further, since such a material is produced by sintering, a material added as a sintering accellator thereof may easily react with the optical glass, so that a molding operation for producing a highly accurate optical glass element can not be performed. Also, the mold in which carbon having high density is coated with an SiC firm may easily react with the optical glass containing lead oxide and alkali elements in large quantities because the coating film is made of beta silicon carbide ($\beta$-SiC) and therefore the mold is not suitable for producing such a highly accurate optical glass element.

Now, it is known that the noble metal alloy made for the bulk of platinum or the like is used as a material of an optical glass melting crucible. A mechanical property of the bulk of noble metal alloy, for example, strength or hardness, is inferior to that of other materials. Therefore, it is difficult to say that the properties of the noble metal alloy such as being reaction proof against the optical glass and aving oxidation resistance are sufficiently practically used in producing optical glass elements.

Generally, it is known that various physical properties of a thin film act differently from that of the bulk material and therefore also a mechanical property of the thin film is different from that of the bulk material. Specifically, the mechanical property of the thin film is superior to that of the bulk material, that is, the mechanical property of a thin film of the noble metal alloy is superior to that of the bulk of noble metal alloy.

Thus, a noble metal alloy having superior reaction proof against an optical glass and superior oxidation resistance, is formed into a thin film and a mold for producing an optical glass element is coated with such a thin film to thereby improve the mold in its mechanical property.

SUMMARY OF THE INVENTION

An object of the present invention is to produce an optical glass element at a low cost.

Another object of the present invention is to produce an optical glass element having high surface quality and high surface accuracy. That is, the object of the present invention is to produce an optical glass element having high surface quality and high surface accuracy at a low cost.

Still another object of the present invention is to provide a mold by which optical glass can be molded into the form of an optical glass element having high surface quality and high surface accuracy.

A further object of the present invention is to provide an optical glass element which is molded into a desired shape, which has high surface quality and high surface accuracy, and which is produced at a low cost.

Such objects as described above can be attained by the molding method according to the present invention, in which optical glass is heated and pressed by using a mold coated with a thin film of a noble metal alloy and molded into an optical glass element having a desired shape.

The molding method for producing an optical glass element comprises the steps of (1) preparing a block of optical glass softened by preheating, (2) hot-pressing the softened optical glass block by using a mold coated with a thin film of noble metal alloy to thereby mold the optical glass block in the form of an optical glass element having a desired shape, (3) cooling the optical glass element at a temperature not higher than an annealing temperature of the optical glass under the condition that the optical glass element is held in the mold, and (4) taking out the optical glass element from the mold.

The use of a mold for producing the optical glass element having a high surface quality and high surface accuracy is especially important in molding the optical glass. It is known that if melted and softened optical glass is molded by a mold, the surface texture of the mold is accurately copied on the surface of the resultant optical glass element. Therefore, in order to produce an optical glass element having high surface quality and high surface accuracy, it is necessary to use a mold having a press-molding surface of high surface quality and high surface accuracy. Moreover, it is required that the high surface quality and the high surface accuracy of the press-molding surface of the mold do not vary even after optical glass elements have been molded many times. It is required also that the press-molding surface of the mold must not be adhered to and reacted with the optical glass. Such problems as described above can be solved by using a mold coated with a thin film of a noble metal alloy according to the present invention as a mold for producing an optical glass element.

Noble metal has a minimum chemical reaction against optical glass, however, a mechanical property thereof, such as hardness or strength, is inferior to that of other materials. The mechanical property can be improved by alloying the noble metal. Preferably, the noble metal alloy used for a mold for producing an optical glass element contains 99-30 weight % of platinum and a remainder containing at least one element selected from the group of iridium, osmium, palladium, rhodium, and ruthenium. The mechanical property of the noble metal alloy having such a composition as described above is superior to that of only the platinum and the noble metal alloy does not react with optical glass. Further, if the noble metal alloy is shaped in the form of a thin film, the mechanical property thereof becomes superior to that of the bulk material. A compound material of metal and ceramics, having a superior mechanical property, is coated with the noble metal alloy thin film so that the mechanical property is considerably improved due to the synergistic effect. Preferably, the compound material of metal and ceramics is hard metal containing wolfram carbide as its principal component, cermet containing titanium carbide as its principal component, cermet containing alumina as its principal component, cermet containing titanium nitride as its principal component, cermet containing chromium carbide as its principal component. These compound materials agree with the noble metal alloy in coefficient of thermal expansion and there is a small inner strain in the noble metal alloy thin film, so that the adhesive force between the noble metal alloy and the compound material is superior. Each of these compound materials can be worked into an element having high surface quality and high surface accuracy and having a desired shape by using a diamond cutting-tool and ultra-fine grains of diamond in a relatively short time. It is possible to produce a mold having high surface quality and high surface accuracy by coating the thus processed compound material with the noble metal alloy thin film. Alternatively, a mold may be formed in such a manner that the compound material of metal and ceramics is coated with the noble metal alloy thin film and then the noble metal alloy thin film is processed to have high surface quality and high surface accuracy by using a cutting-tool and ultra-fine grains of diamond.

Thus, it is possible to produce many optical glass elements having high surface quality and high surface accuracy, inexpensively, by using a mold coated with a noble metal alloy thin film which is improved in reaction proof property against optical glass, oxidation resistance, and mechanical property and which has high surface quality and high surface accuracy.

DESCRIPTION OF THE PREFERRED EMBODIMENTS

Preferred embodiments of the present invention will be described, hereunder.

EMBODIMENT 1

Figure 2:
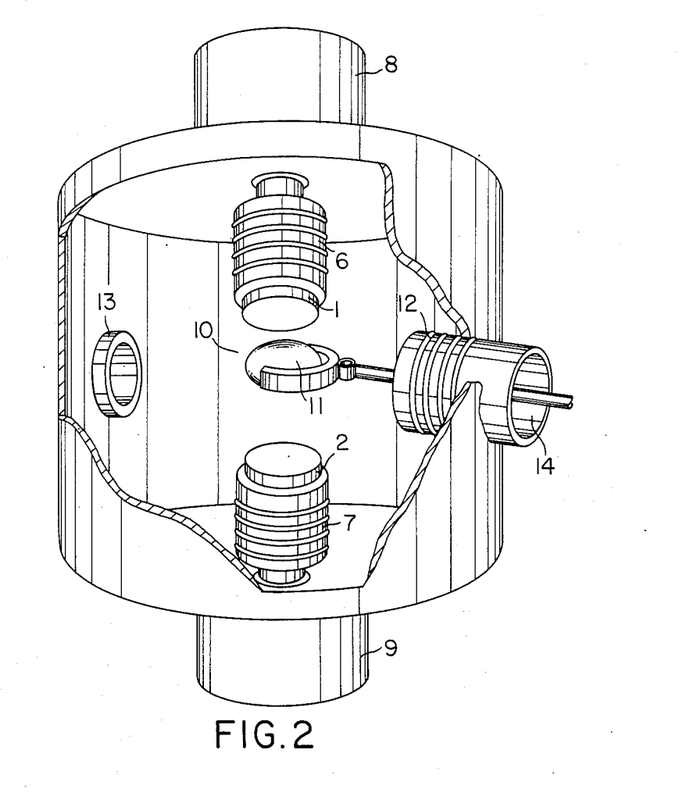
FIG. 2 is a perspective view partly in section showing the molding device used for molding an optical glass element according to the present invention.

Referring to FIGS. 1 and 2, and Table 1, an embodiment according to the present invention will be described.

FIG. 1 is a perspective view showing an upper and a lower mold 1 and 2 constituting a mold assembly used in molding for producing optical glass elements according to the present invention. As the material for both the upper and lower molds 1 and 2, a cylindrical blank made of hard metal having a diameter of 30 mm and a length of 50 mm was used, the hard metal containing wolfram carbide (WC) as a principal component, 10 weight % of titanium carbide (TiC), 10 weight % of tantalum carbide (TaC) and 8 weight % of cobalt (Co) (hereinafter referred to as (WC-10TiC-10TaC-8Co)). A concave molding surface 4 having a curvature radius of 46 mm and angle notches 3 at four portions at the periphery of the concave molding surfaces were formed in the upper mold 1 and a concave molding surface 5 having a curvature radius of 200 mm were formed in the lower mold 2 by discharge work. Further, these molding surfaces 4 and 5 were lapped by using urtra-fine diamond powder and worked to provide optical mirror surfaces respectively.

Next, a noble metal alloy thin film having a thickness of 2 $\mu$m was formed by a spattering method on each of the molding surfaces 4 and 5 which were finished to be mirror surfaces. The noble metal alloy is a platinum-irridium alloy having an irridium by content of 40 weight % (Pt-40Ir).

FIG. 2 is a perspective view partly in section showing the mold in which heaters 6 and 7 are wound around the outer surfaces of the foregoing upper and lower molds 1 and 2, which are attached onto an upper and a lower plunger 8 and 9 of a press respectively. The working portion is enclosed with a cover 10 because the molding operation is performed in a atomosphere of nitrogen gas. In FIG. 2, a spherical block 11 of lead oxide group optical glass having a radius of 20 mm was grasped by a raw-material supply jig 12, the lead oxide group optical glass containing 70 weight % of lead oxide (PbO), 27 weight % of silicon oxide ($SiO_2$), and a few rate of remainder. After heated in a tunnel-shaped preheating furnace 13, the spherical block 11 was held between the upper and lower molds 1 and 2, which were preheated to 500° C., at a pressure of 40 kg/cm² for 2 minutes, and then cooled to 300° C. together with the upper and lower molds 1 and 2 in the state as they were. Then the upper plunger 8 was returned and the molded optical glass element was taken out through a removal opening 14. Such a press-molding operation was repeated 300 times and thereafter the upper and lower molds 1 and 2 were detached from the plungers 8 and 9 respectively. The shape accuracy and the surface roughness of the molding surfaces 4 and 5 of the upper and lower molds as well as the optical characteristic of the molded optical glass elements were examined.

These examinations were repeated with respect to various pairs of molds respectively having noble metal alloy thin films which were different in thickness. The results of examinations are shown in Table 1.

For the sake of comparison, other molds were prepared by forming thin film nobel metal alloys which were outside the scope of those alloys of this application on a material of hard metal, and examined under the same molding conditions. The results of the examinations are also shown in Table 1.

TABLE 1

| | Result of Molding of Optical Glass of Lead Oxide Group | | | | | | | | |
|---|---|---|---|---|---|---|---|---|---|
| Sample No. | Composition of Noble Metal Alloy (weight %) | | | | | | Surface Roughness of Mold After 300 Times Molding (μm) | Shape Accuracy After 300 Times Molding | Optical Property of Molded Optical Glass |
| | Pt | Ir | Rh | Pd | Ru | Os | | | |
| 1 | 99 | 1 | — | — | — | — | 0.02 | O | O |
| 2 | 60 | 40 | — | — | — | — | 0.02 | O | O |
| 3 | 30 | 70 | — | — | — | — | 0.02 | O | O |
| 4* | 99.5 | 0.5 | — | — | — | — | 0.09 | Slight Deform | X |
| 5* | 25 | 75 | — | — | — | — | 0.07 | Whitely Turbid | X |
| 6 | 99 | — | 1 | — | — | — | 0.02 | O | O |
| 7 | 60 | — | 40 | — | — | — | 0.01 | O | O |
| 8 | 30 | — | 70 | — | — | — | 0.02 | O | O |
| 9* | 99.5 | — | 0.5 | — | — | — | 0.08 | Slight Deform | X |
| 10* | 25 | — | 75 | — | — | — | 0.09 | Whitely Turbid | X |
| 11 | 99 | — | — | 1 | — | — | 0.02 | O | O |
| 12 | 60 | — | — | 40 | — | — | 0.02 | O | O |
| 13 | 30 | — | — | 70 | — | — | 0.01 | O | O |
| 14* | 99.5 | — | — | 0.5 | — | — | 0.08 | Slight Deform | X |
| 15* | 25 | — | — | 75 | — | — | 0.08 | Whitely Turbid | X |
| 16 | 99 | — | — | — | 1 | — | 0.02 | O | O |
| 17 | 60 | — | — | — | 40 | — | 0.02 | O | O |
| 18 | 30 | — | — | — | 70 | — | 0.01 | O | O |
| 19* | 99.5 | — | — | — | 0.5 | — | 0.10 | Slight Deform | X |
| 20* | 25 | — | — | — | 75 | — | 0.09 | Whitely Turbid | X |
| 21 | 99 | — | — | — | — | 1 | 0.02 | O | O |
| 22 | 60 | — | — | — | — | 40 | 0.02 | O | O |
| 23 | 30 | — | — | — | — | 70 | 0.02 | O | O |
| 24* | 99.5 | — | — | — | — | 0.5 | 0.08 | Slight Deform | X |
| 25* | 25 | — | — | — | — | 75 | 0.09 | Whitely Turbid | X |
| 26 | 99 | 0.5 | 0.5 | — | — | — | 0.02 | O | O |
| 27 | 60 | 20 | 20 | — | — | — | 0.02 | O | O |
| 28 | 30 | 35 | 35 | — | — | — | 0.02 | O | O |
| 29* | 99.5 | 0.2 | 0.3 | — | — | — | 0.11 | Slight Deform | X |
| 30* | 25 | 40 | 35 | — | — | — | 0.10 | Whitely Turbid | X |
| 31 | 99 | 0.5 | — | 0.5 | — | — | 0.02 | O | O |
| 32 | 60 | 20 | — | 20 | — | — | 0.01 | O | O |
| 33 | 30 | 35 | — | 35 | — | — | 0.01 | O | O |
| 34* | 99.5 | 0.2 | — | 0.3 | — | — | 0.12 | Slight Deform | X |
| 35* | 25 | 40 | — | 35 | — | — | 0.09 | Whitely Turbid | X |
| 36 | 99 | 0.5 | — | — | 0.5 | — | 0.02 | O | O |
| 37 | 60 | 20 | — | — | 20 | — | 0.02 | O | O |
| 38 | 30 | 35 | — | — | 35 | — | 0.01 | O | O |
| 39* | 99.5 | 0.2 | — | — | 0.3 | — | 0.08 | Slight Deform | X |
| 40* | 25 | 40 | — | — | 35 | — | 0.11 | Whitely Turbid | X |
| 41 | 99 | 0.5 | — | — | — | 0.5 | 0.02 | O | O |
| 42 | 60 | 20 | — | — | — | 20 | 0.02 | O | O |
| 43 | 30 | 35 | — | — | — | 35 | 0.02 | O | O |
| 44* | 99.5 | 0.2 | — | — | — | 0.3 | 0.09 | Slight Deform | X |
| 45* | 25 | 40 | — | — | — | 35 | 0.08 | Whitely Turbid | X |
| 46 | 99 | — | 0.5 | 0.5 | — | — | 0.02 | O | O |
| 47 | 60 | — | 20 | 20 | — | — | 0.01 | O | O |
| 48 | 30 | — | 35 | 35 | — | — | 0.02 | O | O |
| 49* | 99.5 | — | 0.2 | 0.3 | — | — | 0.08 | Slight | X |

TABLE 1-continued

Result of Molding of Optical Glass of Lead Oxide Group

| Sample No. | Composition of Noble Metal Alloy (weight %) | | | | | | Surface Roughness of Mold After 300 Times Molding (μm) | Shape Accuracy After 300 Times Molding | Optical Property of Molded Optical Glass |
|---|---|---|---|---|---|---|---|---|---|
| | Pt | Ir | Rh | Pd | Ru | Os | | | |
| 50* | 25 | — | 40 | 35 | — | — | 0.07 | Deform Whitely Turbid | X |
| 51 | 99 | — | 0.5 | — | 0.5 | — | 0.02 | O | O |
| 52 | 60 | — | 20 | — | 20 | — | 0.02 | O | O |
| 53 | 30 | — | 35 | — | 35 | — | 0.02 | O | O |
| 54* | 99.5 | — | 0.2 | — | 0.3 | — | 0.08 | Slight Deform | X |
| 55* | 25 | — | 40 | — | 35 | — | 0.08 | Whitely Turbid | X |
| 56 | 99 | — | 0.5 | — | — | 0.5 | 0.02 | O | O |
| 57 | 60 | — | 20 | — | — | 20 | 0.02 | O | O |
| 58 | 30 | — | 35 | — | — | 35 | 0.01 | O | O |
| 59* | 99.5 | — | 0.2 | — | — | 0.3 | 0.07 | Slight Deform | X |
| 60* | 25 | — | 40 | — | — | 35 | 0.08 | Whitely Turbid | X |
| 61 | 99 | — | — | 0.5 | 0.5 | — | 0.02 | O | O |
| 62 | 60 | — | — | 20 | 20 | — | 0.01 | O | O |
| 63 | 30 | — | — | 35 | 35 | — | 0.02 | O | O |
| 64* | 99.5 | — | — | 0.2 | 0.3 | — | 0.09 | Slight Deform | X |
| 65* | 25 | — | — | 40 | 35 | — | 0.08 | Whitely Turbid | X |
| 66 | 99 | — | — | 0.5 | — | 0.5 | 0.02 | O | O |
| 67 | 60 | — | — | 20 | — | 20 | 0.02 | O | O |
| 68 | 30 | — | — | 35 | — | 35 | 0.02 | O | O |
| 69* | 99.5 | — | — | 0.2 | — | 0.3 | 0.08 | Slight Deform | X |
| 70* | 25 | — | — | 40 | — | 35 | 0.07 | Whitely Turbid | X |
| 71 | 99 | — | — | — | 0.5 | 0.5 | 0.01 | O | O |
| 72 | 60 | — | — | — | 20 | 20 | 0.01 | O | O |
| 73 | 30 | — | — | — | 35 | 35 | 0.02 | O | O |
| 74* | 99.5 | — | — | — | 0.2 | 0.3 | 0.09 | Slight Deform | X |
| 75* | 25 | — | — | — | 40 | 35 | 0.09 | Whitely Turbid | X |
| 76 | 99 | 0.3 | 0.3 | 0.4 | — | — | 0.02 | O | O |
| 77 | 60 | 15 | 15 | 10 | — | — | 0.01 | O | O |
| 78 | 30 | 30 | 20 | 20 | — | — | 0.02 | O | O |
| 79* | 99.5 | 0.2 | 0.2 | 0.1 | — | — | 0.07 | Slight Deform | X |
| 80* | 25 | 25 | 25 | 25 | — | — | 0.08 | Whitely Turbid | X |
| 81 | 99 | 0.3 | 0.3 | — | 0.4 | — | 0.02 | O | O |
| 82 | 60 | 15 | 15 | — | 10 | — | 0.02 | O | O |
| 83 | 30 | 30 | 20 | — | 20 | — | 0.01 | O | O |
| 84* | 99.5 | 0.2 | 0.2 | — | 0.1 | — | 0.08 | Slight Deform | X |
| 85* | 25 | 25 | 25 | — | 25 | — | 0.07 | Whitely Turbid | X |
| 86 | 99 | 0.3 | — | 0.3 | 0.4 | — | 0.02 | O | O |
| 87 | 60 | 15 | — | 15 | 10 | — | 0.02 | O | O |
| 88 | 30 | 30 | — | 20 | 20 | — | 0.02 | O | O |
| 89* | 99.5 | 0.2 | — | 0.2 | 0.1 | — | 0.09 | Slight Deform | X |
| 90* | 25 | 25 | — | 25 | 25 | — | 0.07 | Whitely Turbid | X |
| 91 | 99 | — | 0.3 | 0.3 | 0.4 | — | 0.02 | O | O |
| 92 | 60 | — | 15 | 15 | 10 | — | 0.02 | O | O |
| 93 | 30 | — | 30 | 20 | 20 | — | 0.02 | O | O |
| 94* | 99.5 | — | 0.2 | 0.2 | 0.1 | — | 0.09 | Slight Deform | X |
| 95* | 25 | — | 25 | 25 | 25 | — | 0.08 | Whitely Turbid | X |
| 96 | 99 | 0.3 | 0.3 | — | — | 0.4 | 0.02 | O | O |
| 97 | 60 | 15 | 15 | — | — | 10 | 0.02 | O | O |
| 98 | 30 | 30 | 20 | — | — | 20 | 0.02 | O | O |
| 99* | 99.5 | 0.2 | 0.2 | — | — | 0.1 | 0.08 | Slight Deform | X |
| 100* | 25 | 25 | 25 | — | — | 25 | 0.08 | Whitely Turbid | X |
| 101 | 99 | 0.3 | — | 0.3 | — | 0.4 | 0.02 | O | O |
| 102 | 60 | 15 | — | 15 | — | 10 | 0.02 | O | O |

TABLE 1-continued

Result of Molding of Optical Glass of Lead Oxide Group

| Sample No. | Composition of Noble Metal Alloy (weight %) | | | | | | Surface Roughness of Mold After 300 Times Molding (μm) | Shape Accuracy After 300 Times Molding | Optical Property of Molded Optical Glass |
|---|---|---|---|---|---|---|---|---|---|
| | Pt | Ir | Rh | Pd | Ru | Os | | | |
| 103 | 30 | 30 | — | 20 | — | 20 | 0.01 | O | O |
| 104* | 99.5 | 0.2 | — | 0.2 | — | 0.1 | 0.08 | Slight Deform | X |
| 105* | 25 | 25 | — | 25 | — | 25 | 0.07 | Whitely Turbid | X |
| 106 | 99 | — | 0.3 | 0.3 | — | 0.4 | 0.02 | O | O |
| 107 | 60 | — | 15 | 15 | — | 10 | 0.01 | O | O |
| 108 | 30 | — | 30 | 20 | — | 20 | 0.01 | O | O |
| 109* | 99.5 | — | 0.2 | 0.2 | — | 0.1 | 0.07 | Slight Deform | X |
| 110* | 25 | — | 25 | 25 | — | 25 | 0.07 | Whitely Turbid | X |
| 111 | 99 | 0.3 | — | — | 0.3 | 0.4 | 0.02 | O | O |
| 112 | 60 | 15 | — | — | 15 | 10 | 0.01 | O | O |
| 113 | 30 | 30 | — | — | 20 | 20 | 0.01 | O | O |
| 114* | 99.5 | 0.2 | — | — | 0.2 | 0.1 | 0.07 | Slight Deform | X |
| 115* | 25 | 25 | — | — | 25 | 25 | 0.08 | Whitely Turbid | X |
| 116 | 99 | — | 0.3 | — | 0.3 | 0.4 | 0.02 | O | O |
| 117 | 60 | — | 15 | — | 15 | 10 | 0.02 | O | O |
| 118 | 30 | — | 30 | — | 20 | 20 | 0.02 | O | O |
| 119* | 99.5 | — | 0.2 | — | 0.2 | 0.1 | 0.08 | Slight Deform | X |
| 120* | 25 | — | 25 | — | 25 | 25 | 0.09 | Whitely Turbid | X |
| 121 | 99 | — | — | 0.3 | 0.3 | 0.4 | 0.02 | O | O |
| 122 | 60 | — | — | 15 | 15 | 10 | 0.02 | O | O |
| 123 | 30 | — | — | 30 | 20 | 20 | 0.02 | O | O |
| 124* | 99.5 | — | — | 0.2 | 0.2 | 0.1 | 0.10 | Slight Deform | X |
| 125* | 25 | — | — | 25 | 25 | 25 | 0.09 | Whitely Turbid | X |
| 126 | 99 | 0.2 | 0.3 | 0.2 | 0.3 | — | 0.01 | O | O |
| 127 | 60 | 10 | 10 | 10 | 10 | — | 0.02 | O | O |
| 128 | 30 | 15 | 20 | 15 | 20 | — | 0.01 | O | O |
| 129* | 99.5 | 0.1 | 0.1 | 0.1 | 0.2 | — | 0.07 | Slight Deform | X |
| 130* | 25 | 20 | 20 | 20 | 15 | — | 0.07 | Whitely Turbid | X |
| 131 | 99 | 0.2 | 0.3 | 0.2 | — | 0.3 | 0.01 | O | O |
| 132 | 60 | 10 | 10 | 10 | — | 10 | 0.02 | O | O |
| 133 | 30 | 15 | 20 | 15 | — | 20 | 0.02 | O | O |
| 134* | 99.5 | 0.1 | 0.1 | 0.1 | — | 0.2 0.07 | Slight Deform | X | |
| 135* | 25 | 20 | 20 | 20 | — | 15 | 0.07 | Whitely Turbid | X |
| 136 | 99 | 0.2 | 0.3 | — | 0.2 | 0.3 | 0.02 | O | O |
| 137 | 60 | 10 | 10 | — | 10 | 10 | 0.01 | O | O |
| 138 | 30 | 15 | 20 | — | 15 | 20 | 0.01 | O | O |
| 139* | 99.5 | 0.1 | 0.1 | — | 0.1 | 0.2 | 0.07 | Slight Deform | X |
| 140* | 25 | 20 | 20 | — | 20 | 15 | 0.09 | Whitely Turbid | X |
| 141 | 99 | 0.2 | — | 0.3 | 0.2 | 0.3 | 0.02 | O | O |
| 142 | 60 | 10 | — | 10 | 10 | 10 | 0.02 | O | O |
| 143 | 30 | 15 | — | 20 | 15 | 20 | 0.02 | O | O |
| 144* | 99.5 | 0.1 | — | 0.1 | 0.1 | 0.2 | 0.06 | Slight Deform | X |
| 145* | 25 | 20 | — | 20 | 20 | 15 | 0.07 | Whitely Turbid | X |
| 146 | 99 | — | 0.2 | 0.3 | 0.2 | 0.3 | 0.02 | O | O |
| 147 | 60 | — | 10 | 10 | 10 | 10 | 0.02 | O | O |
| 148 | 30 | — | 15 | 20 | 15 | 20 | 0.02 | O | O |
| 149* | 99.5 | — | 0.1 | 0.1 | 0.1 | 0.2 | 0.07 | Slight Deform | X |
| 150* | 25 | — | 20 | 20 | 20 | 15 | 0.08 | Whitely Turbid | X |
| 151 | 99 | 0.2 | 0.2 | 0.2 | 0.2 | 0.2 | 0.01 | O | O |
| 152 | 60 | 8 | 8 | 8 | 8 | 8 | 0.01 | O | O |
| 153 | 30 | 15 | 10 | 15 | 10 | 20 | 0.02 | O | O |
| 154* | 99.5 | 0.1 | 0.1 | 0.1 | 0.1 | 0.1 | 0.07 | Slight Deform | X |
| 155* | 25 | 15 | 15 | 15 | 15 | 15 | 0.06 | Whitely | X |

TABLE 1-continued

| | Result of Molding of Optical Glass of Lead Oxide Group | | | | | | | | |
|---|---|---|---|---|---|---|---|---|---|
| Sample No. | Composition of Noble Metal Alloy (weight %) | | | | | | Surface Roughness of Mold After 300 Times Molding (μm) | Shape Accuracy After 300 Times Molding | Optical Property of Molded Optical Glass |
| | Pt | Ir | Rh | Pd | Ru | Os | | | |
| | | | | | | | | Turbid | |

(1) The mark ° attached at the upper right side of the number of a sample represents a comparison example.
(2) The mark O written in the item as to the shape accuracy after molding operations of 300 times shows the fact that the shape accuracy of the mold did not change.
(3) The mark O written in the item as to the optical properties of the molded optical glass element shows the fact that the optical properties of the molded optical glass element is superior, while the mark X represents the reverse fact.

As seen from Table 1, when optical glass was molded by the mold according to the present invention, optical glass elements having a superior optical characteristic can be manufactured inexpensively in large quantities. The surface roughness and the shape accuracy of the molds did not change even after optical glass was molded 300 times by using the same molds. The molds according to the present invention have such features that the molds do not react with optical glass, and that the molds are improved in oxidation resistance as well as in mechanical characteristics such as strength and hardness. The molds have such a further feature that the molds can be worked to provide high surface quality and high shape accuracy by using a cutting tool and grains of diamond in a short time such as about an hour.

On the contrary, in the optical glass elements obtained by using the molds as described as those outside the scope of this invention, fine scars or variations in shape were generated and the optical characteristics thereof were deteriorated. Further, a very small quantity of optical glass adhered to the molds, resulting in such a phenomenon that the molds as well as the molded optical glass elements acquired a white appearance.

In the embodiment as described above, the hard metal having the composition of WC-10TiC-10TaC-8Co was used, however, the composition of the hard metal according to the present invention is not limited to such a composition as described above. Also, hard metal containing WC as a principal component and, for example, NbC, Mo$_2$C, Cr$_3$C$_2$, VC, Ni, and the like, as additives may be used. Moreover, the respective shapes of the notch 3 and the molding surfaces 4 and 5 are not limited to those illustrated in the embodiment as described above and it is to be recognized that the notch 3 and the molding surfaces 4 and 5 may be shaped in the form of a prism, a filter, or the like.

EMBODIMENT 2

A noble metal alloy thin film having a thickness of 2 μm was formed on cermet by the spattering method and an upper and a lower mold 1 and 2 were formed in the same manner as in the Embodiment 1, the noble metal alloy being a platinum-iridium alloy mixed with iridium (Ir) by 40 weight percent (Pt-40Ir), and the cermet containing titanium carbide (TiC) as its principal component, 5 weight % of niobium carbide (NbC) and 9 weight % of nickel (Ni) (Tic-5NbC-9Ni). Further, for the sake of comparison, molds were prepared by forming a thin film of a noble metal alloy outside the scope of claims of this application on such a base material as described above.

Experiments were performed by using each pair of upper and lower molds 1 and 2 as described above, in the same manner as in the Embodiment 1, and the results as shown in Table 2 were obtained.

TABLE 2

| | Result of Molding of Optical Glass of Lead Oxide Group | | | | | | | | |
|---|---|---|---|---|---|---|---|---|---|
| Sample No. | Composition of Noble Metal Alloy (weight %) | | | | | | Surface Roughness of Mold After 300 Times Molding (μm) | Shape Accuracy After 300 Times Molding | Optical Property of Molded Optical Glass |
| | Pt | Ir | Rh | Pd | Ru | Os | | | |
| 1 | 99 | 1 | — | — | — | — | 0.01 | O | O |
| 2 | 60 | 40 | — | — | — | — | 0.01 | O | O |
| 3 | 30 | 70 | — | — | — | — | 0.02 | O | O |
| 4* | 99.5 | 0.5 | — | — | — | — | 0.08 | Slight Deform | X |
| 5* | 25 | 75 | — | — | — | — | 0.09 | Whitely Turbid | X |
| 6 | 99 | — | 1 | — | — | — | 0.02 | O | O |
| 7 | 60 | — | 40 | — | — | — | 0.02 | O | O |
| 8 | 30 | — | 70 | — | — | — | 0.01 | O | O |
| 9* | 99.5 | — | 0.5 | — | — | — | 0.09 | Slight Deform | X |
| 10* | 25 | — | 75 | — | — | — | 0.08 | Whitely Turbid | X |
| 11 | 99 | — | — | 1 | — | — | 0.02 | O | O |
| 12 | 60 | — | — | 40 | — | — | 0.02 | O | O |
| 13 | 30 | — | — | 70 | — | — | 0.02 | O | O |
| 14* | 99.5 | — | — | 0.5 | — | — | 0.10 | Slight Deform | X |
| 15* | 25 | — | — | 75 | — | — | 0.12 | Whitely Turbid | X |
| 16 | 99 | — | — | — | 1 | — | 0.02 | O | O |

TABLE 2-continued

Result of Molding of Optical Glass of Lead Oxide Group

| Sample No. | Composition of Noble Metal Alloy (weight %) | | | | | | Surface Roughness of Mold After 300 Times Molding (μm) | Shape Accuracy After 300 Times Molding | Optical Property of Molded Optical Glass |
|---|---|---|---|---|---|---|---|---|---|
| | Pt | Ir | Rh | Pd | Ru | Os | | | |
| 17 | 60 | — | — | — | 40 | — | 0.02 | O | O |
| 18 | 30 | — | — | — | 70 | — | 0.02 | O | O |
| 19* | 99.5 | — | — | — | 0.5 | — | 0.08 | Slight Deform | X |
| 20* | 25 | — | — | — | 75 | — | 0.07 | Whitely Turbid | X |
| 21 | 99 | — | — | — | — | 1 | 0.02 | O | O |
| 22 | 60 | — | — | — | — | 40 | 0.01 | O | O |
| 23 | 30 | — | — | — | — | 70 | 0.02 | O | O |
| 24* | 99.5 | — | — | — | — | 0.5 | 0.08 | Slight Deform | X |
| 25* | 25 | — | — | — | — | 75 | 0.08 | Whitely Turbid | X |
| 26 | 99 | 0.5 | 0.5 | — | — | — | 0.02 | O | O |
| 27 | 60 | 20 | 20 | — | — | — | 0.01 | O | O |
| 28 | 30 | 35 | 35 | — | — | — | 0.01 | O | O |
| 29* | 99.5 | 0.2 | 0.3 | — | — | — | 0.12 | Slight Deform | X |
| 30* | 25 | 40 | 35 | — | — | — | 0.09 | Whitely Turbid | X |
| 31 | 99 | 0.5 | — | 0.5 | — | — | 0.02 | O | O |
| 32 | 60 | 20 | — | 20 | — | — | 0.01 | O | O |
| 33 | 30 | 35 | — | 35 | — | — | 0.01 | O | O |
| 34* | 99.5 | 0.2 | — | 0.3 | — | — | 0.10 | Slight Deform | X |
| 35* | 25 | 40 | — | 35 | — | — | 0.08 | Whitely Turbid | X |
| 36 | 99 | 0.5 | — | — | 0.5 | — | 0.01 | O | O |
| 37 | 60 | 20 | — | — | 20 | — | 0.01 | O | O |
| 38 | 30 | 35 | — | — | 35 | — | 0.01 | O | O |
| 39* | 99.5 | 0.2 | — | — | 0.3 | — | 0.09 | Slight Deform | O |
| 40* | 25 | 40 | — | — | 35 | — | 0.07 | Whitely Turbid | X |
| 41 | 99 | 0.5 | — | — | — | 0.5 | 0.01 | O | O |
| 42 | 60 | 20 | — | — | — | 20 | 0.01 | O | O |
| 43 | 30 | 35 | — | — | — | 35 | 0.02 | O | O |
| 44* | 99.5 | 0.2 | — | — | — | 0.3 | 0.11 | Slight Deform | X |
| 45* | 25 | 40 | — | — | — | 35 | 0.08 | Whitely Turbid | X |
| 46 | 99 | — | 0.5 | 0.5 | — | — | 0.02 | O | O |
| 47 | 60 | — | 20 | 20 | — | — | 0.01 | O | O |
| 48 | 30 | — | 35 | 35 | — | — | 0.02 | O | O |
| 49* | 99.5 | — | 0.2 | 0.3 | — | — | 0.08 | Slight Deform | X |
| 50* | 25 | — | 40 | 35 | — | — | 0.09 | Whitely Turbid | X |
| 51 | 99 | — | 0.5 | — | 0.5 | — | 0.02 | O | O |
| 52 | 60 | — | 20 | — | 20 | — | 0.02 | O | O |
| 53 | 30 | — | 35 | — | 35 | — | 0.02 | O | O |
| 54* | 99.5 | — | 0.2 | — | 0.3 | — | 0.09 | Slight Deform | X |
| 55* | 25 | — | 40 | — | 35 | — | 0.09 | Whitely | X |
| 56 | 99 | — | 0.5 | — | — | 0.5 | 0.01 | O | O |
| 57 | 60 | — | 20 | — | — | 20 | 0.02 | O | O |
| 58 | 30 | — | 35 | — | — | 35 | 0.02 | O | O |
| 59* | 99.5 | — | 0.2 | — | — | 0.3 | 0.11 | Slight Deform | X |
| 60* | 25 | — | 40 | — | — | 35 | 0.12 | Whitely Turbid | X |
| 61 | 99 | — | — | 0.5 | 0.5 | — | 0.02 | O | O |
| 62 | 60 | — | — | 20 | 20 | — | 0.01 | O | O |
| 63 | 30 | — | — | 35 | 35 | — | 0.01 | O | O |
| 64* | 99.5 | — | — | 0.2 | 0.3 | — | 0.07 | Slight Deform | X |
| 65* | 25 | — | — | 40 | 35 | — | 0.08 | Whitely Turbid | X |
| 66 | 99 | — | — | 0.5 | — | 0.5 | 0.02 | O | O |
| 67 | 60 | — | — | 20 | — | 20 | 0.02 | O | O |
| 68 | 30 | — | — | 35 | — | 35 | 0.02 | O | O |
| 69* | 99.5 | — | — | 0.2 | — | 0.3 | 0.09 | Slight Deform | X |
| 70* | 25 | — | — | 40 | — | 35 | 0.10 | Whitely Turbid | X |

TABLE 2-continued

Result of Molding of Optical Glass of Lead Oxide Group

| Sample No. | Composition of Noble Metal Alloy (weight %) | | | | | | Surface Roughness of Mold After 300 Times Molding (μm) | Shape Accuracy After 300 Times Molding | Optical Property of Molded Optical Glass |
|---|---|---|---|---|---|---|---|---|---|
| | Pt | Ir | Rh | Pd | Ru | Os | | | |
| 71 | 99 | — | — | — | 0.5 | 0.5 | 0.01 | O | O |
| 72 | 60 | — | — | — | 20 | 20 | 0.01 | O | O |
| 73 | 30 | — | — | — | 35 | 35 | 0.01 | O | O |
| 74* | 99.5 | — | — | — | 0.2 | 0.3 | 0.08 | Slight Deform | X |
| 75* | 25 | — | — | — | 40 | 35 | 0.12 | Whitely Turbid | X |
| 76 | 99 | 0.3 | 0.3 | 0.4 | — | — | 0.01 | O | O |
| 77 | 60 | 15 | 15 | 10 | — | — | 0.01 | O | O |
| 78 | 30 | 30 | 20 | 20 | — | — | 0.01 | O | O |
| 79* | 99.5 | 0.2 | 0.2 | 0.1 | — | — | Slight | X Deform | |
| 80* | 25 | 25 | 25 | 25 | — | — | 0.07 | Whitely Turbid | X |
| 81 | 99 | 0.3 | 0.3 | — | 0.4 | — | 0.01 | O | O |
| 82 | 60 | 15 | 15 | — | 10 | — | 0.01 | O | O |
| 83 | 30 | 30 | 20 | — | 20 | — | 0.01 | O | O |
| 84* | 99.5 | 0.2 | 0.2 | — | 0.1 | — | 0.08 | Slight Deform | X |
| 85* | 25 | 25 | 25 | — | 25 | — | 0.10 | Whitely Turbid | X |
| 86 | 99 | 0.3 | — | 0.3 | 0.4 | — | 0.02 | O | O |
| 87 | 60 | 15 | — | 15 | 10 | — | 0.01 | O | O |
| 88 | 30 | 30 | — | 20 | 20 | — | 0.01 | O | O |
| 89* | 99.5 | 0.2 | — | 0.2 | 0.1 | — | 0.12 | Slight Deform | X |
| 90* | 25 | 25 | — | 25 | 25 | — | 0.10 | Whitely Turbid | X |
| 91 | 99 | — | 0.3 | 0.3 | 0.4 | — | 0.02 | O | O |
| 92 | 60 | — | 15 | 15 | 10 | — | 0.02 | O | O |
| 93 | 30 | — | 30 | 20 | 20 | — | 0.02 | O | O |
| 94* | 99.5 | — | 0.2 | 0.2 | 0.1 | — | 0.10 | Slight Deform | X |
| 95* | 25 | — | 25 | 25 | 25 | — | 0.11 | Whitely Turbid | X |
| 96 | 99 | 0.3 | 0.3 | — | — | 0.4 | 0.01 | O | O |
| 97 | 60 | 15 | 15 | — | — | 10 | 0.01 | O | O |
| 98 | 30 | 30 | 20 | — | — | 20 | 0.01 | O | O |
| 99* | 99.5 | 0.2 | 0.2 | — | — | 0.1 | 0.07 | Slight Deform | X |
| 100* | 25 | 25 | 25 | — | | 25 | 0.11 | Whitely Turbid | X |
| 101 | 99 | 0.3 | — | 0.3 | — | 0.4 | 0.01 | O | O |
| 102 | 60 | 15 | — | 15 | — | 10 | 0.01 | O | O |
| 103 | 30 | 30 | — | 20 | — | 20 | 0.02 | O | O |
| 104* | 99.5 | 0.2 | — | 0.2 | — | 0.1 | 0.12 | Slight Deform | X |
| 105* | 25 | 25 | — | 25 | — | 25 | 0.10 | Whitely Turbid | X |
| 106 | 99 | — | 0.3 | 0.3 | — | 0.4 | 0.02 | O | O |
| 107 | 60 | — | 15 | 15 | — | 10 | 0.02 | O | O |
| 108 | 30 | — | 30 | 20 | — | 20 | 0.02 | O | O |
| 109* | 99.5 | — | 0.2 | 0.2 | — | 0.1 | 0.09 | Slight Deform | X |
| 110* | 25 | — | 25 | 25 | — | 25 | 0.11 | Whitely Turbid | X |
| 111 | 99 | 0.3 | — | — | 0.3 | 0.4 | 0.01 | O | O |
| 112 | 60 | 15 | — | — | 15 | 10 | 0.01 | O | O |
| 113 | 30 | 30 | — | — | 20 | 20 | 0.01 | O | O |
| 114* | 99.5 | 0.2 | — | — | 0.2 | 0.1 | 0.07 | Slight Deform | X |
| 115* | 25 | 25 | — | — | 25 | 25 | 0.09 | Whitely Turbid | X |
| 116 | 99 | — | 0.3 | — | 0.3 | 0.4 | 0.02 | O | O |
| 117 | 60 | — | 15 | — | 15 | 10 | 0.01 | O | O |
| 118 | 30 | — | 30 | — | 20 | 20 | 0.02 | O | O |
| 119* | 99.5 | — | 0.2 | — | 0.2 | 0.1 | 0.10 | Slight Deform | X |
| 120* | 25 | — | 25 | — | 25 | 25 | 0.12 | Whitely Turbid | X |
| 121 | 99 | — | — | 0.3 | 0.3 | 0.4 | 0.02 | O | O |
| 122 | 60 | — | — | 15 | 15 | 10 | 0.02 | O | O |
| 123 | 30 | — | — | 30 | 20 | 20 | 0.02 | O | O |
| 124* | 99.5 | — | — | 0.2 | 0.2 | 0.1 | 0.07 | Slight Deform | X |

TABLE 2-continued

Result of Molding of Optical Glass of Lead Oxide Group

| Sample No. | Composition of Noble Metal Alloy (weight %) | | | | | | Surface Roughness of Mold After 300 Times Molding (μm) | Shape Accuracy After 300 Times Molding | Optical Property of Molded Optical Glass |
|---|---|---|---|---|---|---|---|---|---|
| | Pt | Ir | Rh | Pd | Ru | Os | | | |
| 125* | 25 | — | — | 25 | 25 | 25 | 0.06 | Whitely Turbid | X |
| 126 | 99 | 0.2 | 0.3 | 0.2 | 0.3 | — | 0.01 | O | O |
| 127 | 60 | 10 | 10 | 10 | 10 | — | 0.01 | O | O |
| 128 | 30 | 15 | 20 | 15 | 20 | — | 0.01 | O | O |
| 129* | 99.5 | 0.1 | 0.1 | 0.1 | 0.2 | — | 0.07 | Slight Deform | X |
| 130* | 25 | 20 | 20 | 20 | 15 | — | 0.07 | Whitely Turbid | X |
| 131 | 99 | 0.2 | 0.3 | 0.2 | — | 0.3 | 0.01 | O | O |
| 132 | 60 | 10 | 10 | 10 | — | 10 | 0.02 | O | O |
| 133 | 30 | 15 | 20 | 15 | — | 20 | 0.01 | O | O |
| 134* | 99.5 | 0.1 | 0.1 | 0.1 | — | 0.2 | 0.08 | Slight Deform | X |
| 135* | 25 | 20 | 20 | 20 | — | 15 | 0.09 | Whitely Turbid | X |
| 136 | 99 | 0.2 | 0.3 | — | 0.2 | 0.3 | 0.01 | O | O |
| 137 | 60 | 10 | 10 | — | 10 | 10 | 0.01 | O | O |
| 138 | 30 | 15 | 20 | — | 15 | 20 | 0.01 | O | O |
| 139* | 99.5 | 0.1 | 0.1 | — | 0.1 | 0.2 | 0.07 | Slight Deform | X |
| 140* | 25 | 20 | 20 | — | 20 | 15 | 0.06 | Whitely Turbid | X |
| 141 | 99 | 0.2 | — | 0.3 | 0.2 | 0.3 | 0.01 | O | O |
| 142 | 60 | 10 | — | 10 | 10 | 10 | 0.01 | O | O |
| 143 | 30 | 15 | — | 20 | 15 | 20 | 0.02 | O | O |
| 144* | 99.5 | 0.1 | — | 0.1 | 0.1 | 0.2 | 0.08 | Slight Deform | X |
| 145* | 25 | 20 | — | 20 | 20 | 15 | 0.06 | Whitely Turbid | X |
| 146 | 99 | — | 0.2 | 0.3 | 0.2 | 0.3 | 0.02 | O | O |
| 147 | 60 | — | 10 | 10 | 10 | 10 | 0.02 | O | O |
| 148 | 30 | — | 15 | 20 | 15 | 20 | 0.01 | O | O |
| 149* | 99.5 | — | 0.1 | 0.1 | 0.1 | 0.2 | 0.07 | Slight Deform | X |
| 150* | 25 | — | 20 | 20 | 20 | 15 | 0.07 | Whitely Turbid | X |
| 151 | 99 | 0.2 | 0.2 | 0.2 | 0.2 | 0.2 | 0.01 | O | O |
| 152 | 60 | 8 | 8 | 8 | 8 | 8 | 0.01 | O | O |
| 153 | 30 | 15 | 10 | 15 | 10 | 20 | 0.02 | O | O |
| 154* | 99.5 | 0.1 | 0.1 | 0.1 | 0.1 | 0.1 | 0.06 | Slight Deform | X |
| 155* | 25 | 15 | 15 | 15 | 15 | 15 | 0.07 | Whitely Turbid | X |

Note:
(1) The mark * attached at the upper right side of the number of a sample represents a comparison example.
(2) The mark O written in the item as to the shape accuracy after molding operations of 300 times shows the fact that the shape accuracy of the mold did not change.
(3) The mark O written in the item as to the optical properties of the molded optical glass element shows the fact that the optical properties of the molded optical glass element is superior, while the mark X represents the reverse fact.

As seen from Table 2, when optical glass was molded by the mold according to the present invention, the optical glass elements having a superior optical characteristic can be manufactured inexpensively in large quantities. The surface roughness and the shape accuracy of the molds did not change even after optical glass was molded 300 times by using the same molds.

On the contrary, in the optical glass elements obtained by using the molds as described as those outside the scope of this invention, fine scars or variations in shape were generated and the optical characteristics thereof were deteriorated. Further, a very small quantity of optical glass adhered to on the molds, resulting in such a phenomenon that the molds as well as the molded optical glass elements acquired a white appearance.

In the embodiment as described above, cermet having the composition of TiC-5NbC-9Ni was used, however, the composition of the cermet is not limited to such a composition as described above, but cermet containing TiC as a principal component and, for example, TiN, TaC, $Mo_2C$, $Cr_3C_2$, VC, ZrC, Mo, Co, Cr, and the like, as additives, may be used.

EMBODIMENT 3

As the material for both the upper and lower molds 1 and 2, a cylindrical blank made of cermet having a diameter of 30 mm and a length of 50 mm was used, the cermet containing titanium nitride (TiN) as a principal component, 30 weight % of titanium carbide (TiC) and 7 weight % of molybdenum (Mo) (hereinafter referred to as (Tin-30TiC-7Mo)). A concave molding surface 4 having a curvature radius of 25 mm and angle notches 3 at six portions at the periphery of the concave molding surfaces were formed in the upper mold 1 and a concave molding surface 5 having a curvature radius of 100 mm were formed in the lower mold 2 by discharge work. Further, these molding surfaces 4 and 5 were worked by a precise NC grinder so as to improve the shape accuracy, and lapped and polished so as to provide mirror surfaces respectively.

Next, a noble metal alloy thin film having a thickness of 50 μm was formed by a spattering method on each of the molding surfaces 4 and 5 which were finished to be mirror surfaces. The noble metal alloy is a platinum-irridium alloy mixed with irridium by 40 weight % (Pt-40Ir). Each of the molding surfaces 4 and 5 coated with the noble metal alloy thin film was worked into the form of an aspherical mirror surface by a diamond grinding method in which a diamond cutting-tool was used in an ultra-precise NC lathe. An almost perfect mirror surface was obtained only by performing this work, however, slight lather cutting scars remained and a polishing operation was further performed in a short time to eliminate the scars to thereby make the mirror surface perfect.

As shown in FIG. 2, heaters 6 and 7 are wound around the outer surfaces of the foregoing upper and lower molds 1 and 2, and attached onto an upper and a lower plunger 8 and 9 of a press respectively. A spherical block 11 of lead oxide group optical glass having a radius of 20 mm was put on the molding surface 5 of the lower mold 2 and the upper mold 1 was approached to an extent not to allow the upper mold to come into contact with the lead oxide group optical glass spherical block 11, the lead oxide group optical glass containing 80 weight % of lead oxide (PbO), 10 weight % of silicon oxide ($SiO_2$), 8 weight % of boric acid ($B_2O_3$) and a few rate of remainder. The upper and lower molds 1 and 2 were heated to 570° C., and maintained in this state for 2 minutes to soften the lead oxide group optical glass spherical block 11. Immediately thereafter, the temperature of the upper and lower molds 1 and 2 is made to be 430° C. and a pressure of 30 kg/$cm^2$ is maintained between the upper and lower molds 1 and 2 for 2 minutes. After the upper and lower molds 1 and 2 were cooled to 280° C. in the state as they were, the upper plunger 8 was returned and the molded optical glass element was taken out through a removal opening 14. Such a press-molding operation was repeated 300 times and thereafter the upper and lower molds 1 and 2 were detached. The shape accuracy and the surface roughness of the molding surfaces 4 and 5 of the upper and lower molds as well as the optical characteristic of the molded optical glass elements were examined.

These examinations were repeated with respect to various pairs of molds respectively having noble metal alloy thin films which were different in thickness. The results of examinations are shown in Table 3. For the sake of comparison, other molds were prepared by forming thin films nobel metal alloys which were outside the scope of those alloys of this invention on cermet, and examined under the same molding conditions as described above. The results of the examinations are also shown in Table 3.

TABLE 3

| Sample No. | Composition of Noble Metal Alloy (weight %) | | | | | | Surface Roughness of Mold After 300 Times Molding (μm) | Shape Accuracy After 300 Times Molding | Optical Property of Molded Optical Glass |
|---|---|---|---|---|---|---|---|---|---|
| | Pt | Ir | Rh | Pd | Ru | Os | | | |
| 1 | 99 | 1 | — | — | — | — | 0.01 | O | O |
| 2 | 60 | 40 | — | — | — | — | 0.01 | O | O |
| 3 | 30 | 70 | — | — | — | — | 0.01 | O | O |
| 4* | 99.5 | 0.5 | — | — | — | — | 0.09 | Slight Deform | X |
| 5* | 25 | 75 | — | — | — | — | 0.08 | Whitely Turbid | X |
| 6 | 99 | — | 1 | — | — | — | 0.02 | O | |
| 7 | 60 | — | 40 | — | — | — | 0.01 | O | O |
| 8 | 30 | — | 70 | — | — | — | 0.01 | O | O |
| 9* | 99.5 | — | 0.5 | — | — | — | 0.10 | Slight Deform | X |
| 10* | 25 | — | 75 | — | — | — | 0.11 | Whitely Turbid | X |
| 11 | 99 | — | — | 1 | — | — | 0.02 | O | O |
| 12 | 60 | — | — | 40 | — | — | 0.02 | O | O |
| 13 | 30 | — | — | 70 | — | — | 0.02 | O | O |
| 14* | 99.5 | — | — | 0.5 | — | — | 0.07 | Slight Deform | X |
| 15* | 25 | — | — | 75 | — | — | 0.07 | Whitely Turbid | X |
| 16 | 99 | — | — | — | 1 | — | 0.02 | O | O |
| 17 | 60 | — | — | — | 40 | — | 0.02 | O | O |
| 18 | 30 | — | — | — | 70 | — | 0.01 | O | O |
| 19* | 99.5 | — | — | — | 0.5 | — | 0.06 | Slight Deform | X |
| 20* | 25 | — | — | — | 75 | — | 0.08 | Whitely Turbid | X |
| 21 | 99 | — | — | — | — | 1 | 0.02 | O | O |
| 22 | 60 | — | — | — | — | 40 | 0.01 | O | O |
| 23 | 30 | — | — | — | — | 70 | 0.01 | O | O |
| 24* | 99.5 | — | — | — | — | 0.5 | 0.09 | Slight Deform | X |
| 25* | 25 | — | — | — | — | 75 | 0.08 | Whitely Turbid | X |
| 26 | 99 | 0.5 | 0.5 | — | — | — | 0.01 | O | O |
| 27 | 60 | 20 | 20 | — | — | — | 0.01 | O | O |
| 28 | 30 | 35 | 35 | — | — | — | 0.01 | O | O |
| 29* | 99.5 | 0.2 | 0.3 | — | — | — | 0.06 | Slight Deform | X |

TABLE 3-continued

| Sample No. | Composition of Noble Metal Alloy (weight %) | | | | | | Surface Roughness of Mold After 300 Times Molding (μm) | Shape Accuracy After 300 Times Molding | Optical Property of Molded Optical Glass |
|---|---|---|---|---|---|---|---|---|---|
| | Pt | Ir | Rh | Pd | Ru | Os | | | |
| 30* | 25 | 40 | 35 | — | — | — | 0.06 | Whitely Turbid | X |
| 31 | 99 | 0.5 | — | 0.5 | — | — | 0.01 | O | O |
| 32 | 60 | 20 | — | 20 | — | — | 0.01 | O | O |
| 33 | 30 | 35 | — | 35 | — | — | 0.01 | O | O |
| 34* | 99.5 | 0.2 | — | 0.3 | — | — | 0.08 | Slight Deform | X |
| 35* | 25 | 40 | — | 35 | — | — | 0.06 | Whitely Turbid | X |
| 36 | 99 | 0.5 | — | — | 0.5 | — | 0.01 | O | O |
| 37 | 60 | 20 | — | — | 20 | — | 0.01 | O | O |
| 38 | 30 | 35 | — | — | 35 | — | 0.02 | O | O |
| 39* | 99.5 | 0.2 | — | — | 0.3 | — | 0.09 | Slight Deform | X |
| 40* | 25 | 40 | — | — | 35 | — | 0.07 | Whitely Turbid | X |
| 41 | 99 | 0.5 | — | — | — | 0.5 | 0.01 | O | O |
| 42 | 60 | 20 | — | — | — | 20 | 0.01 | O | O |
| 43 | 30 | 35 | — | — | — | 35 | 0.01 | O | O |
| 44* | 99.5 | 0.2 | — | — | — | 0.3 | 0.09 | Slight Deform | X |
| 45* | 25 | 40 | — | — | — | 35 | 0.09 | Whitely | X |
| 46 | 99 | — | 0.5 | 0.5 | — | — | 0.02 | O | O |
| 47 | 60 | — | 20 | 20 | — | — | 0.01 | O | O |
| 48 | 30 | — | 35 | 35 | — | — | 0.01 | O | O |
| 49* | 99.5 | — | 0.2 | 0.3 | — | — | 0.07 | Slight Deform | X |
| 50* | 25 | — | 40 | 35 | — | — | 0.09 | Whitely Turbid | X |
| 51 | 99 | — | 0.5 | — | 0.5 | — | 0.02 | O | O |
| 52 | 60 | — | 20 | — | 20 | — | 0.02 | O | O |
| 53 | 30 | — | 35 | — | 35 | — | 0.02 | O | O |
| 54* | 99.5 | — | 0.2 | — | 0.3 | — | 0.10 | Slight Deform | X |
| 55* | 25 | — | 40 | — | 35 | — | 0.11 | Whitely Turbid | X |
| 56 | 99 | — | 0.5 | — | — | 0.5 | 0.01 | O | O |
| 57 | 60 | — | 20 | — | — | 20 | 0.01 | O | O |
| 58 | 30 | — | 35 | — | — | 35 | 0.02 | O | O |
| 59* | 99.5 | — | 0.2 | — | — | 0.3 | 0.10 | Slight Deform | X |
| 60* | 25 | — | 40 | — | — | 35 | 0.08 | Whitely Turbid | X |
| 61 | 99 | — | — | 0.5 | 0.5 | — | 0.02 | O | O |
| 62 | 60 | — | — | 20 | 20 | — | 0.02 | O | O |
| 63 | 30 | — | — | 35 | 35 | — | 0.02 | O | O |
| 64* | 99.5 | — | — | 0.2 | 0.3 | — | 0.07 | Slight Deform | X |
| 65* | 25 | — | — | 40 | 35 | — | 0.08 | Whitely Turbid | X |
| 66 | 99 | — | — | 0.5 | — | 0.5 | 0.02 | O | O |
| 67 | 60 | — | — | 20 | — | 20 | 0.01 | O | O |
| 68 | 30 | — | — | 35 | — | 35 | 0.01 | O | O |
| 69* | 99.5 | — | — | 0.2 | — | 0.3 | 0.08 | Slight Deform | X |
| 70* | 25 | — | — | 40 | — | 35 | 0.08 | Whitely Turbid | X |
| 71 | 99 | — | — | — | 0.5 | 0.5 | 0.01 | O | O |
| 72 | 60 | — | — | — | 20 | 20 | 0.01 | O | O |
| 73 | 30 | — | — | — | 35 | 35 | 0.01 | O | O |
| 74* | 99.5 | — | — | — | 0.2 | 0.2 | 0.09 | Slight Deform | X |
| 75* | 25 | — | — | — | 40 | 35 | 0.07 | Whitely Turbid | X |
| 76 | 99 | 0.3 | 0.3 | 0.4 | — | — | 0.01 | O | O |
| 77 | 60 | 15 | 15 | 10 | — | — | 0.01 | O | O |
| 78 | 30 | 30 | 20 | 20 | — | — | 0.01 | O | O |
| 79* | 99.5 | 0.2 | 0.2 | 0.1 | — | — | 0.06 | Slight Deform | X |
| 80* | 25 | 25 | 25 | 25 | — | — | 0.06 | Whitely Turbid | X |
| 81 | 99 | 0.3 | 0.3 | — | 0.4 | — | 0.01 | O | O |
| 82 | 60 | 15 | 15 | — | 10 | — | 0.01 | O | O |
| 83 | 30 | 30 | 20 | — | 20 | — | 0.01 | O | O |
| 84* | 99.5 | 0.2 | 0.2 | — | 0.1 | — | 0.07 | Slight Deform | X |
| 85* | 25 | 25 | 25 | — | 25 | — | 0.07 | Whitely | X |

TABLE 3-continued

| Sample No. | Composition of Noble Metal Alloy (weight %) | | | | | | Surface Roughness of Mold After 300 Times Molding (μm) | Shape Accuracy After 300 Times Molding | Optical Property of Molded Optical Glass |
|---|---|---|---|---|---|---|---|---|---|
| | Pt | Ir | Rh | Pd | Ru | Os | | | |
| 86 | 99 | 0.3 | — | 0.3 | 0.4 | — | 0.02 | O | O |
| 87 | 60 | 15 | — | 15 | 10 | — | 0.01 | O | O |
| 88 | 30 | 30 | — | 20 | 20 | — | 0.01 | O | O |
| 89* | 99.5 | 0.2 | — | 0.2 | 0.1 | — | 0.08 | Slight Deform | X |
| 90* | 25 | 25 | — | 25 | 25 | — | 0.06 | Whitely Turbid | X |
| 91 | 99 | — | 0.3 | 0.3 | 0.4 | — | 0.02 | O | O |
| 92 | 60 | — | 15 | 15 | 10 | — | 0.02 | O | O |
| 93 | 30 | — | 30 | 20 | 20 | — | 0.02 | O | O |
| 94* | 99.5 | — | 0.2 | 0.2 | 0.1 | — | 0.07 | Slight Deform | X |
| 95* | 25 | — | 25 | 25 | 25 | — | 0.07 | Whitely Turbid | X |
| 96 | 99 | 0.3 | 0.3 | — | — | 0.4 | 0.01 | O | O |
| 97 | 60 | 15 | 15 | — | — | 10 | 0.01 | O | O |
| 98 | 30 | 30 | 20 | — | — | 20 | 0.01 | O | O |
| 99* | 99.5 | 0.2 | 0.2 | — | — | 0.1 | 0.06 | Slight Deform | X |
| 100* | 25 | 25 | 25 | — | — | 25 | 0.07 | Whitely Turbid | X |
| 101 | 99 | 0.3 | — | 0.3 | — | 0.4 | 0.01 | O | O |
| 102 | 60 | 15 | — | 15 | — | 10 | 0.01 | O | O |
| 103 | 30 | 30 | — | 20 | — | 20 | 0.01 | O | O |
| 104* | 99.5 | 0.2 | — | 0.2 | — | 0.1 | 0.09 | Slight Deform | X |
| 105* | 25 | 25 | — | 25 | — | 25 | 0.08 | Whitely Turbid | X |
| 106 | 99 | — | 0.3 | 0.3 | — | 0.4 | 0.02 | O | O |
| 107 | 60 | — | 15 | 15 | — | 10 | 0.01 | O | O |
| 108 | 30 | — | 30 | 20 | — | 20 | 0.02 | O | O |
| 109* | 99.5 | — | 0.2 | 0.2 | — | 0.1 | 0.09 | Slight Deform | X |
| 110* | 25 | — | 25 | 25 | — | 25 | 0.08 | Whitely Turbid | X |
| 111 | 99 | 0.3 | — | — | 0.3 | 0.4 | 0.01 | O | O |
| 112 | 60 | 15 | — | — | 15 | 10 | 0.01 | O | O |
| 113 | 30 | 30 | — | — | 20 | 20 | 0.01 | O | O |
| 114* | 99.5 | 0.2 | — | — | 0.2 | 0.1 | 0.07 | Slight Deform | X |
| 115* | 25 | 25 | — | — | 25 | 25 | 0.06 | Whitely Turbid | X |
| 116 | 99 | — | 0.3 | — | 0.3 | 4 | 0.02 | O | O |
| 117 | 60 | — | 15 | — | 15 | 10 | 0.02 | O | O |
| 118 | 30 | — | 30 | — | 20 | 20 | 0.02 | O | O |
| 119* | 99.5 | — | 0.2 | — | 0.2 | 0.1 | 0.11 | Slight Deform | X |
| 120* | 25 | — | 25 | — | 25 | 25 | 0.10 | Whitely Turbid | X |
| 121 | 99 | — | — | 0.3 | 0.3 | 0.4 | 0.02 | O | O |
| 122 | 60 | — | — | 15 | 15 | 10 | 0.01 | O | O |
| 123 | 30 | — | — | 30 | 20 | 20 | 0.02 | O | O |
| 124* | 99.5 | — | — | 0.2 | 0.2 | 0.1 | 0.09 | Slight Deform | X |
| 125* | 25 | — | — | 25 | 25 | 25 | 0.11 | Whitely Turbid | X |
| 126 | 99 | 0.2 | 0.3 | 0.2 | 0.3 | — | 0.01 | O | O |
| 127 | 60 | 10 | 10 | 10 | 10 | — | 0.01 | O | O |
| 128 | 30 | 15 | 20 | 15 | 20 | — | 0.01 | O | O |
| 129* | 99.5 | 0.1 | 0.1 | 0.1 | 0.2 | — | 0.07 | Slight Deform | X |
| 130* | 25 | 20 | 20 | 20 | 15 | — | 0.06 | Whitely Turbid | X |
| 131 | 99 | 0.2 | 0.3 | 0.2 | — | 0.3 | 0.01 | O | O |
| 132 | 60 | 10 | 10 | 10 | — | 10 | 0.01 | O | O |
| 133 | 30 | 15 | 20 | 15 | — | 20 | 0.01 | O | O |
| 134* | 99.5 | 0.1 | 0.1 | 0.1 | — | 0.2 | 0.07 | Slight Deform | X |
| 135* | 25 | 20 | 20 | 20 | — | 15 | 0.08 | Whitely Turbid | X |
| 136 | 99 | 0.2 | 0.3 | — | 0.2 | 0.3 | 0.01 | O | O |
| 137 | 60 | 10 | 10 | — | 10 | 10 | 0.01 | O | O |
| 138 | 30 | 15 | 20 | — | 15 | 20 | 0.01 | O | O |
| 139* | 99.5 | 0.1 | 0.1 | — | 0.1 | 0.2 | 0.09 | Slight Deform | X |
| 140* | 25 | 20 | 20 | — | 20 | 15 | 0.06 | Whitely | X |

TABLE 3-continued

| Sample No. | Composition of Noble Metal Alloy (weight %) | | | | | | Surface Roughness of Mold After 300 Times Molding (μm) | Shape Accuracy After 300 Times Molding | Optical Property of Molded Optical Glass |
|---|---|---|---|---|---|---|---|---|---|
| | Pt | Ir | Rh | Pd | Ru | Os | | | |
| | | | | | | | | Turbid | |
| 141 | 99 | 0.2 | — | 0.3 | 0.2 | 0.3 | 0.02 | O | O |
| 142 | 60 | 10 | — | 10 | 10 | 10 | 0.01 | O | O |
| 143 | 30 | 15 | — | 20 | 15 | 20 | 0.01 | O | O |
| 144* | 99.5 | 0.1 | — | 0.1 | 0.1 | 0.2 | 0.08 | Slight Deform | X |
| 145* | 25 | 20 | — | 20 | 20 | 15 | 0.07 | Whitely Turbid | X |
| 146 | 99 | — | 0.2 | 0.3 | 0.2 | 0.3 | 0.02 | O | O |
| 147 | 60 | — | 10 | 10 | 10 | 10 | 0.02 | O | O |
| 148 | 30 | — | 15 | 20 | 15 | 20 | 0.01 | O | O |
| 149* | 99.5 | — | 0.1 | 0.1 | 0.1 | 0.2 | 0.11 | Slight Deform | X |
| 150* | 25 | — | 20 | 20 | 20 | 15 | 0.08 | Whitely Turbid | X |
| 151 | 99 | 0.2 | 0.2 | 0.2 | 0.2 | 0.2 | 0.02 | O | O |
| 152 | 60 | 8 | 8 | 8 | 8 | 8 | 0.01 | O | O |
| 153 | 30 | 15 | 10 | 15 | 10 | 20 | 0.01 | O | O |
| 154* | 99.5 | 0.1 | 0.1 | 0.1 | 0.1 | 0.1 | 0.07 | Slight Deform | X |
| 155* | 25 | 15 | 15 | 15 | 15 | 15 | 0.07 | Whitely Turbid | X |

Note:
(1) The mark * attached at the upper right side of the number of a sample represents a comparison example.
(2) The mark O written in the item as to the shape accuracy after molding operations of 300 times shows the fact that the shape accuracy of the mold did not change.
(3) The mark O written in the item as to the optical properties of the molded optical glass element shows the fact that the optical properties of the molded optical glass element is superior, while the mark X represents the reverse fact.

As seen from Table 3, when optical glass was molded by the mold according to the present invention, the optical glass elements having a superior optical characteristic can be manufactured inexpensively in large quantities. The surface roughness and the shape accuracy of the molds did not change even after optical glass was molded 300 times by using the same molds.

On the contrary, in the optical glass elements obtained by using the molds as described as those outside the scope of this invention, fine scars or variations in shape were generated and the optical characteristics thereof were deteriorated. Further, a very small quantity of optical glass adhered to the molds, resulting in such a phenomenon that the molds as well as the molded optical glass elements acquired a white appearance.

In the embodiment as described above, cermet having the composition of TiN-30TiC-7Mo was used, however, the composition of the cermet is not limited to such a composition as described above, but cermet containing TiN as a principal component and, for example, TaC, WC, NbC, TaN, MoC, $Cr_3C_2$, VC, Ni, Co, and the like, as additives, may be used.

EMBODIMENT 4

As an upper mold 1, a cylindrical blank made of cermet ($Al_2O_3$-25Cr) having a diameter of 30 mm and a length of 50 mm was used, the cermet containing alumina ($Al_2O_3$) as its principal component and 25 weight % of chromium (Cr), and as a lower mold 2, a cylindrical blank made of cermet ($Cr_3C_2$-13Ni) having a diameter of 30 mm and a length of 50 mm was used, the cermet containing chromium carbide ($Cr_3C_2$) as its principal component and 13 weight % of nickel (Ni). A concave molding surface 4 having a curvature radius of 25 mm and angle notches 3 at six portions at the periphery of the concave molding surfaces were formed in the upper mold 1 and a concave molding surface 5 having a curvature radius of 100 mm were formed in the lower mold 2 by discharge work. Further, these molding surfaces 4 and 5 were worked by a precise NC grinder so as to improve in shape accuracy, and lapped and polished so as to provide mirror surfaces respectively.

Next, a noble metal alloy thin film having a thickness of 50 μm was formed by a spattering method on each of the molding surfaces 4 and 5 which were finished to be mirror surfaces. The noble metal alloy was a platinum-irridium alloy mixed with irridium by 40 weight % (Pt-40Ir). Each of the molding surfaces 4 and 5 coated with the noble metal alloy thin film was worked into the form of an aspherical mirror surface by a diamond grinding method in which a diamond cutting-tool was used in an ultra-precise NC lathe.

Lead oxide group optical glass containing 80 weight % of PbO, 10 weight % of $SiO_2$, 8 weight % of $B_2O_3$ and a remainder of a few rate, was molded by using the molds 1 and 2 in the same manner as in the Embodiment 3 and the molded results are shown in Table 4.

TABLE 4

Result of Molding of Optical Glass of Lead Oxide Group

| Sample No. | Composition of Noble Metal Alloy (weight %) | | | | | | Surface Roughness of Mold After 300 Times Molding (μm) | Shape Accuracy After 300 Times Molding | Optical Property of Molded Optical Glass |
|---|---|---|---|---|---|---|---|---|---|
| | Pt | Ir | Rh | Pd | Ru | Os | | | |
| 1 | 99 | 1 | — | — | — | — | 0.01 | O | O |
| 2 | 60 | 40 | — | — | — | — | 0.01 | O | O |
| 3 | 30 | 70 | — | — | — | — | 0.01 | O | O |
| 4* | 99.5 | 0.5 | — | — | — | — | 0.08 | Slight Deform | X |
| 5* | 25 | 75 | — | — | — | — | 0.07 | Whitely Turbid | X |
| 6 | 99 | — | 1 | — | — | — | 0.02 | O | O |
| 7 | 60 | — | 40 | — | — | — | 0.01 | O | O |
| 8 | 30 | — | 70 | — | — | — | 0.01 | O | O |
| 9* | 99.5 | — | 0.5 | — | — | — | 0.12 | Slight Deform | X |
| 10* | 25 | — | 75 | — | — | — | 0.09 | Whitely Turbid | X |
| 11 | 99 | — | — | 1 | — | — | 0.02 | O | O |
| 12 | 60 | — | — | 40 | — | — | 0.02 | O | O |
| 13 | 30 | — | — | 70 | — | — | 0.01 | O | O |
| 14* | 99.5 | — | — | 0.5 | — | — | 0.09 | Slight Deform | X |
| 15* | 25 | — | — | 75 | — | — | 0.06 | Whitely Turbid | X |
| 16 | 99 | — | — | — | 1 | — | 0.02 | O | O |
| 17 | 60 | — | — | — | 40 | — | 0.01 | O | O |
| 18 | 30 | — | — | — | 70 | — | 0.01 | O | O |
| 19* | 99.5 | — | — | — | 0.5 | — | 0.09 | Slight Deform | X |
| 20* | 25 | — | — | — | 75 | — | 0.08 | Whitely Turbid | X |
| 21 | 99 | — | — | — | — | 1 | 0.02 | O | O |
| 22 | 60 | — | — | — | — | 40 | 0.02 | O | O |
| 23 | 30 | — | — | — | — | 70 | 0.02 | O | O |
| 24* | 99.5 | — | — | — | — | 0.5 | 0.11 | Slight Deform | X |
| 25* | 25 | — | — | — | — | 75 | 0.10 | Whitely Turbid | X |
| 26 | 99 | 0.5 | 0.5 | — | — | — | 0.01 | O | O |
| 27 | 60 | 20 | 20 | — | — | — | 0.01 | O | O |
| 28 | 30 | 35 | 35 | — | — | — | 0.01 | O | O |
| 29* | 99.5 | 0.2 | 0.3 | — | — | — | 0.06 | Slight Deform | X |
| 30* | 25 | 40 | 35 | — | — | — | 0.07 | Whitely Turbid | X |
| 31 | 99 | 0.5 | — | 0.5 | — | — | 0.01 | O | O |
| 32 | 60 | 20 | — | 20 | — | — | 0.01 | O | O |
| 33 | 30 | 35 | — | 35 | — | — | 0.01 | O | O |
| 34* | 99.5 | 0.2 | — | 0.3 | — | — | 0.06 | Slight Deform | X |
| 35* | 25 | 40 | — | 35 | — | — | 0.05 | Whitely Turbid | X |
| 36 | 99 | 0.5 | — | — | 0.5 | — | 0.01 | O | O |
| 37 | 60 | 20 | — | — | 20 | — | 0.01 | O | O |
| 38 | 30 | 35 | — | — | 35 | — | 0.01 | O | O |
| 39* | 99.5 | 0.2 | — | — | 0.5 | — | 0.07 | Slight Deform | X |
| 40* | 25 | 40 | — | — | 35 | — | 0.06 | Whitely Turbid | X |
| 41 | 99 | 0.5 | — | — | — | 0.5 | 0.01 | O | O |
| 42 | 60 | 20 | — | — | — | 20 | 0.01 | O | O |
| 43 | 30 | 35 | — | — | — | 35 | 0.01 | O | O |
| 44* | 99.5 | 0.2 | — | — | — | 0.3 | 0.07 | Slight Deform | X |
| 45* | 25 | 40 | — | — | — | 35 | 0.07 | Whitely Turbid | X |
| 46 | 99 | — | 0.5 | 0.5 | — | — | 0.02 | O | O |
| 47 | 60 | — | 20 | 20 | — | — | 0.01 | O | O |
| 48 | 30 | — | 35 | 35 | — | — | 0.01 | O | O |
| 49* | 99.5 | — | 0.2 | 0.3 | — | — | 0.06 | Slight Deform | X |
| 50* | 25 | — | 40 | 35 | — | — | 0.07 | Whitely Turbid | X |
| 51 | 99 | — | 0.5 | — | 0.5 | — | 0.01 | O | O |
| 52 | 60 | — | 20 | — | 20 | — | 0.01 | O | O |
| 53 | 30 | — | 35 | — | 35 | — | 0.02 | O | O |
| 54* | 99.5 | — | 0.2 | — | 0.3 | — | 0.07 | Slight Deform | |

TABLE 4-continued

Result of Molding of Optical Glass of Lead Oxide Group

| Sample No. | Composition of Noble Metal Alloy (weight %) | | | | | | Surface Roughness of Mold After 300 Times Molding (μm) | Shape Accuracy After 300 Times Molding | Optical Property of Molded Optical Glass |
|---|---|---|---|---|---|---|---|---|---|
| | Pt | Ir | Rh | Pd | Ru | Os | | | |
| 55* | 25 | — | 40 | — | 35 | — | 0.08 | Whitely Turbid | X |
| 56 | 99 | — | 0.5 | — | — | 0.5 | 0.02 | O | O |
| 57 | 60 | — | 20 | — | — | 20 | 0.02 | O | O |
| 58 | 30 | — | 35 | — | — | 35 | 0.01 | O | O |
| 59* | 99.5 | — | 0.2 | — | — | 0.3 | 0.09 | Slight Deform | X |
| 60* | 25 | — | 40 | — | — | 35 | 0.07 | Whitely Turbid | X |
| 61 | 99 | — | — | 0.5 | 0.5 | — | 0.02 | O | O |
| 62 | 60 | — | — | 20 | 20 | — | 0.02 | O | O |
| 63 | 30 | — | — | 35 | 35 | — | 0.02 | O | O |
| 64* | 99.5 | — | — | 0.2 | 0.3 | — | 0.09 | Slight Deform | X |
| 65* | 25 | — | — | 40 | 35 | — | 0.10 | Whitely Turbid | X |
| 66 | 99 | — | — | 0.5 | — | 0.5 | 0.02 | O | O |
| 67 | 60 | — | — | 20 | — | 20 | 0.01 | O | O |
| 68 | 30 | — | — | 35 | — | 35 | 0.02 | O | O |
| 69* | 99.5 | — | — | 0.2 | — | 0.3 | 0.12 | Slight Deform | X |
| 70* | 25 | — | — | 40 | — | 35 | 0.11 | Whitely Turbid | X |
| 71 | 99 | — | — | — | 0.5 | 0.5 | 0.02 | O | O |
| 72 | 60 | — | — | — | 20 | 20 | 0.02 | O | O |
| 73 | 30 | — | — | — | 35 | 35 | 0.02 | O | O |
| 74* | 99.5 | — | — | — | 0.2 | 0.3 | 0.10 | Slight Deform | X |
| 75* | 25 | — | — | — | 40 | 35 | 0.12 | Whitely Turbid | X |
| 76 | 99 | 0.3 | 0.3 | 0.4 | — | — | 0.01 | O | |
| 77 | 60 | 15 | 15 | 10 | — | — | 0.01 | O | |
| 78 | 30 | 30 | 20 | 20 | — | — | 0.01 | O | |
| 79* | 99.5 | 0.2 | 0.2 | 0.1 | — | — | 0.06 | Slight Deform | X |
| 80* | 25 | 25 | 25 | 25 | — | — | 0.08 | Whitely Turbid | X |
| 81 | 99 | 0.3 | 0.3 | — | 0.4 | — | 0.01 | O | O |
| 82 | 60 | 15 | 15 | — | 10 | — | 0.01 | O | O |
| 83 | 30 | 30 | 20 | — | 20 | — | 0.01 | O | O |
| 84* | 99.5 | 0.2 | 0.2 | — | 0.1 | — | 0.06 | Slight Deform | X |
| 85* | 25 | 25 | 25 | — | 25 | — | 0.06 | Whitely Turbid | X |
| 86 | 99 | 0.3 | — | 0.3 | 0.4 | — | 0.01 | O | O |
| 87 | 60 | 15 | — | 15 | 10 | — | 0.01 | O | O |
| 88 | 30 | 30 | — | 20 | 20 | — | 0.01 | O | O |
| 89* | 99.5 | 0.2 | — | 0.2 | 0.1 | — | 0.06 | Slight Deform | X |
| 90* | 25 | 25 | — | 25 | 25 | — | 0.07 | Whitely Turbid | X |
| 91 | 99 | — | 0.3 | 0.3 | 0.4 | — | 0.02 | O | O |
| 92 | 60 | — | 15 | 15 | 10 | — | 0.02 | O | O |
| 93 | 30 | — | 30 | 20 | 20 | — | 0.02 | O | O |
| 94* | 99.5 | — | 0.2 | 0.2 | 0.1 | — | 0.11 | Slight Deform | X |
| 95* | 25 | — | 25 | 25 | 25 | — | 0.12 | Whitely Turbid | X |
| 96 | 99 | 0.3 | 0.3 | — | — | 0.4 | 0.01 | O | O |
| 97 | 60 | 15 | 15 | — | — | 10 | 0.01 | O | O |
| 98 | 30 | 30 | 20 | — | — | 20 | 0.01 | O | O |
| 99* | 99.5 | 0.2 | 0.2 | — | — | 0.1 | 0.06 | Slight Deform | X |
| 100* | 25 | 25 | 25 | — | — | 25 | 0.05 | Whitely Turbid | X |
| 101 | 99 | 0.3 | — | 0.3 | — | 0.4 | 0.01 | O | O |
| 102 | 60 | 15 | — | 15 | — | 10 | 0.01 | O | O |
| 103 | 30 | 30 | — | 20 | — | 20 | 0.01 | O | O |
| 104* | 99.5 | 0.2 | — | 0.2 | — | 0.1 | 0.09 | Slight Deform | X |
| 105* | 25 | 25 | — | 25 | — | 25 | 0.08 | Whitely Turbid | X |
| 106 | 99 | — | 0.3 | 0.3 | — | 0.4 | 0.02 | O | O |
| 107 | 60 | — | 15 | 15 | — | 10 | 0.01 | O | O |
| 108 | 30 | — | 30 | 20 | — | 20 | 0.01 | O | O |

TABLE 4-continued

Result of Molding of Optical Glass of Lead Oxide Group

| Sample No. | Composition of Noble Metal Alloy (weight %) | | | | | | Surface Roughness of Mold After 300 Times Molding (μm) | Shape Accuracy After 300 Times Molding | Optical Property of Molded Optical Glass |
|---|---|---|---|---|---|---|---|---|---|
| | Pt | Ir | Rh | Pd | Ru | Os | | | |
| 109* | 99.5 | — | 0.2 | 0.2 | — | 0.1 | 0.07 | Slight | X |
| 110* | 25 | — | 25 | 25 | — | 25 | 0.06 | Whitely Turbid | X |
| 111 | 99 | 0.3 | — | — | 0.3 | 0.4 | 0.01 | O | O |
| 112 | 60 | 15 | — | — | 15 | 10 | 0.01 | O | O |
| 113 | 30 | 30 | — | — | 20 | 20 | 0.01 | O | O |
| 114* | 99.5 | 0.2 | — | — | 0.2 | 0.1 | 0.06 | Slight Deform | X |
| 115* | 25 | 25 | — | — | 25 | 25 | 0.07 | Whitely Turbid | X |
| 116 | 99 | — | 0.3 | — | 0.3 | 0.4 | 0.02 | O | O |
| 117 | 60 | — | 15 | — | 15 | 10 | 0.02 | O | O |
| 118 | 30 | — | 30 | — | 20 | 20 | 0.01 | O | O |
| 119* | 99.5 | — | 0.2 | — | 0.2 | 0.1 | 0.09 | Slight Deform | X |
| 120* | 25 | — | 25 | — | 25 | 25 | 0.06 | Whitely Turbid | X |
| 121 | 99 | — | — | 0.3 | 0.3 | 0.4 | 0.02 | O | O |
| 122 | 60 | — | — | 15 | 15 | 10 | 0.01 | O | O |
| 123 | 30 | — | — | 30 | 20 | 20 | 0.02 | O | O |
| 124* | 99.5 | — | — | 0.2 | 0.2 | 0.1 | 0.10 | Slight Deform | X |
| 125* | 25 | — | — | 25 | 25 | 25 | 0.08 | Whitely Turbid | X |
| 126 | 99 | 0.2 | 0.3 | 0.2 | 0.3 | — | 0.01 | O | O |
| 127 | 60 | 10 | 10 | 10 | 10 | — | 0.01 | O | O |
| 128 | 30 | 15 | 20 | 15 | 20 | — | 0.01 | O | O |
| 129* | 99.5 | 0.1 | 0.1 | 0.1 | 0.2 | — | 0.06 | Slight Deform | X |
| 130* | 25 | 20 | 20 | 20 | 15 | — | 0.07 | Whitely Turbid | X |
| 131 | 99 | 0.2 | 0.3 | 0.2 | — | 0.3 | 0.01 | O | O |
| 132 | 60 | 10 | 10 | 10 | — | 10 | 0.01 | O | O |
| 133 | 30 | 15 | 20 | 15 | — | 20 | 0.01 | O | O |
| 134* | 99.5 | 0.1 | 0.1 | 0.1 | — | 0.2 | 0.09 | Slight Deform | X |
| 135* | 25 | 20 | 20 | 20 | — | 15 | 0.07 | Whitely Turbid | X |
| 136 | 99 | 0.2 | 0.3 | — | 0.2 | 0.3 | 0.01 | O | O |
| 137 | 60 | 10 | 10 | — | 10 | 10 | 0.01 | O | O |
| 138 | 30 | 15 | 20 | — | 15 | 20 | 0.01 | O | O |
| 139* | 99.5 | 0.1 | 0.1 | — | 0.1 | 0.2 | 0.07 | Slight Deform | X |
| 140* | 25 | 20 | 20 | — | 20 | 15 | 0.05 | Whitely Turbid | X |
| 141 | 99 | 0.2 | — | 0.3 | 0.2 | 0.3 | 0.01 | O | O |
| 142 | 60 | 10 | — | 10 | 10 | 10 | 0.01 | O | O |
| 143 | 30 | 15 | — | 20 | 15 | 20 | 0.01 | O | O |
| 144* | 99.5 | 0.1 | — | 0.1 | 0.1 | 0.2 | 0.08 | Slight Deform | X |
| 145* | 25 | 20 | — | 20 | 20 | 15 | 0.07 | Whitely Turbid | X |
| 146 | 99 | — | 0.2 | 0.3 | 0.2 | 0.3 | 0.02 | O | O |
| 147 | 60 | — | 10 | 10 | 10 | 10 | 0.01 | O | O |
| 148 | 30 | — | 15 | 20 | 15 | 20 | 0.02 | O | O |
| 149* | 99.5 | — | 0.1 | 0.1 | 0.1 | 0.2 | 0.07 | Slight Deform | X |
| 150* | 25 | — | 20 | 20 | 20 | 15 | 0.07 | Whitely Turbid | X |
| 151 | 99 | 0.2 | 0.2 | 0.2 | 0.2 | 0.2 | 0.01 | O | O |
| 152 | 60 | 8 | 8 | Π8 | 8 | 8 | 0.01 | O | O |
| 153 | 30 | 15 | 10 | 15 | 10 | 20 | 0.01 | O | O |
| 154* | 99.5 | 0.1 | 0.1 | 0.1 | 0.1 | 0.1 | 0.06 | Slight Deform | X |
| 155* | 25 | 15 | 15 | 15 | 15 | 15 | 0.07 | Whitely Turbid | X |

Note:
(1) The mark * attached at the upper right side of the number of a sample represents a comparison example.
(2) The mark O written in the item as to the shape accuracy after molding operations of 300 times shows the fact that the shape accuracy of the mold did not change.
(3) The mark O written in the item as to the optical properties of the molded optical glass element shows the fact that the optical properties of the molded optical glass element is superior, while the mark X represents the reverse fact.

As seen from Table 4, when optical glass was molded by the mold according to the present invention, the optical glass elements having a superior optical characteristic can be manufactured inexpensively in large quantities. The surface roughness and the shape accuracy of the molds did not change even after optical glass was molded 300 times by using the same molds.

On the contrary, in the optical glass elements obtained by using the molds as described as those outside the scope of this invention, fine scars or variations in shape were generated and the optical characteristics thereof were deteriorated. Further, a very small quantity of optical glass adhered to the molds, resulting in such a phenomenon that the molds as well as the molded optical glass elements acquired a white appearance.

In the embodiment as described above, cermet having the composition of $Al_2O_3\text{-}25Cr$ and the composition of $Cr_3C_2\text{-}13Ni$ was used, however, the composition of the cermet is not limited to such a composition as described above, but cermet containing $Cr_3C_2$ as a principal component and, for example, MgO, CaO, $Fe_2O_3$, TiC, TaC, WC, Mo, Fe, W, and the like, as additives, may be used.

What is claimed is:

1. In a method for producing an optical glass element which comprises subjecting optical glass in a mold to heat and pressure, the improvement wherein the mold is one obtained by coating a compound material of metal and ceramic with a thin film of a platinum group metal alloy.

2. A method according to claim 1, wherein said platinum group metal alloy is an alloy containing 99–30 weight % of platinum and the remainder containing at least one element selected from the group consisting of iridium (Ir), osmium (Os), palladium (Pd), rhodium (Rh), and ruthenium (Ru).

3. A molding method for producing an optical glass element comprising the steps of:
preparing a mold by coating a compound material of metal and ceramics with a thin film of a platinum group metal alloy; and
molding optical glass into the firm of an optical glass element by using said mold while applying heat and pressure to said optical glass,
wherein said compound material of metal and ceramics is a hard metal containing wolfram carbide (WC) as its principal component, a cermet containing titanium carbide (TiC) as its principal component, a cermet containing titanium nitride (TiN) as its principal component, a cermet containing alumina ($Al_2O_3$) as its principal component, or a cermet containing chromium carbide ($Cr_3C_2$) as its principal component.

4. A method according to claim 3, wherein said platinum group metal alloy is an alloy containing 99–30 weight % of platinum and the remainder containing at least one element selected from the group consisting of iridium (Ir), osmium (Os), palladium (Pd), rhodium (Rh), and ruthenium (Ru).

5. A molding method for producing an optical glass element comprising the steps of:
preheating a block of optical glass to soften it;
hot-pressing said softened optical glass block using a mold obtained by coating a compound material of metal and ceramics with a thin film of platinum group metal alloy to thereby mold said optical glass block into the form of an optical glass element having a desired shape;
cooling said optical glass element at a temperature not higher than the annealing temperature of said optical glass under the condition that said optical glass element is held in said mold; and
removing said optical glass element from said mold.

6. A method according to claim 5, wherein said platinum group metal alloy is an alloy containing 99–30 weight % of platinum and the remainder containing at least one element selected from the group consisting of iridium (Ir), osmium (Os), palladium (Pd), rhodium (Rh), and ruthenium (Ru).

7. A molding method for producing an optical glass element comprising the steps of:
preheating a block of optical glass to soften it;
hot-pressing said softened optical glass block using a mold obtained by coating a compound material of metal and ceramics with a thin film of platinum group metal alloy to thereby mold said optical glass block into a form of an optical glass element having a desired shape;
cooling said optical glass element at a temperature not higher than the annealing temperature of said optical glass under the condition that said optical glass element is held in said mold; and
removing said optical glass element from said mold,
wherein said compound material of metal and ceramics is a hard metal containing wolfram carbide (WC) as its principal component, a cermet containing titanium carbide (TiC) as its principal component, a cermet containing titanium nitride (TiN) as its principal component, a cermet containing alumina ($Al_2O_3$) as its principal component, or a cermet containing chromium carbide ($Cr_3C_2$) as its principal component.

8. A method according to claim 7, wherein said platinum group metal alloy is an alloy containing 99–30 weight % of platinum and the remainder containing at least one element selected from the group consisting of iridium (Ir), osmium (Os), palladium (Pd), rhodium (Rh), and ruthenium (Ru).

9. A mold for producing an optical glass element which comprises a compound material of metal and ceramics coated with a thin film of platinum group metal alloy.

10. A mold according to claim 9, wherein said platinum group metal alloy is an alloy containing 99–30 weight % of platinum and the remainder containing at least one element selected from the group consisting of iridium (Ir), osmium (Os), palladium (Pd), rhodium (Rh), and ruthenium (Ru).

11. A mold for producing an optical glass element which comprises a compound material of metal and ceramics coated with a thin film of platinum group metal alloy, wherein said compound material of metal and ceramics is a hard metal containing wolfram carbide (WC) as its principal component, a cermet containing titanium carbide (TiC) as its principal component, a cermet containing titanium nitride (TiN) as its principal component, a cermet containing alumina ($Al_2O_3$) as its principal component, or a cermet containing chromium carbide ($Cr_3C_2$) as its principal component.

12. A mold according to claim 11, wherein said platinum group metal alloy is an alloy containing 99–30 weight % of platinum and the remainder containing at least one element selected from the group consisting of iridium (Ir), osmium (Os), palladium (Pd), rhodium (Rh), and ruthenium (Ru).

* * * * *